United States Patent [19]

Leymann et al.

[11] Patent Number: 6,028,997

[45] Date of Patent: Feb. 22, 2000

[54] METHOD OF GENERATING AN IMPLEMENTATION OF REUSABLE PARTS FROM CONTAINERS OF A WORKFLOW PROCESS-MODEL

[75] Inventors: Frank Leymann, Aidlingen; Dieter Roller, Schönaich, both of Germany

[73] Assignee: International Business Machines Corporation, Armonk, N.Y.

[21] Appl. No.: 08/866,923

[22] Filed: May 30, 1997

[30]     Foreign Application Priority Data

May 30, 1992 [EP] European Pat. Off. ............ 96 108 635

[51] Int. Cl.$^7$ ........................................................ G06F 9/44
[52] U.S. Cl. .................................... 395/701; 705/7; 705/11; 707/103; 345/349; 345/339; 345/965; 345/967
[58] Field of Search ...................................... 395/701, 702, 395/704, 710; 705/7, 10, 11, 8, 1; 707/100, 200, 500; 709/305, 202, 303; 345/348, 339, 349, 967, 968, 965

[56]             References Cited

U.S. PATENT DOCUMENTS

| | | | |
|---|---|---|---|
| 5,535,322 | 7/1996 | Hecht ........................................... | 705/1 |
| 5,581,691 | 12/1996 | Hsu et al. .................................. | 714/15 |
| 5,630,069 | 5/1997 | Flores et al. ................................ | 705/7 |
| 5,768,506 | 6/1998 | Randell .................................... | 709/202 |

OTHER PUBLICATIONS

D.J. Spohn, "Project Management Environment", IBM Technical Disclosure Bulletin, vol. 32, No. 9A, pp. 250–254, Feb. 1990.

Inniss et al, "Workflow Management Based on an Object–Oriented Paradigm",IBM Technical Disclosure Bulletin, vol. 37, No. 03, p. 185, Mar. 1994.

R.T. Marshak, "IBM's FlowMark, Object–Oriented Workflow for Mission–Critical Applications", Workgroup Computing Report (USA), vol. 17, No. 5, pp. 3–12, 1994.

Leymann et al, "Business process management with Flow-Mark", Digest of Papers, Compcon Spring '94 Conference, pp. 230–234, IEEE Cat. No. 94CH3414–0, 1994.

Leymann et al, "Management Business Processes as an Information Resource", IBM Systems Journal, vol. 33, No. 2, 1994.

Doc. No. GG24–2946–00 "IBM–International Technical Support Centers, Visual Age: Concepts and Features.".

Doc. No. SC34–4496–01/2 "Programmer's Guide to Building Parts for Fun and Profit, Version 4.0.".

Doc. No. GC09–2235–00 "IBM Visual Age C ++for OS/2 User's Guide.".

Doc. No. SH19–8177–00 "Flowmark Programming Guide, 1994.".

Doc. No. S25H–6960–00 "IBM Visual Age C ++for OS/2— Visual Builder User's Guide.".

Doc. No. S25H–6968–00 "IBM Visual Age C ++for OS/2— Building Visual Age C ++Parts for Fun and Profit, Version 3.0.".

*Primary Examiner*—Tariq R. Hafiz
*Assistant Examiner*—Tuan Q. Dam
*Attorney, Agent, or Firm*—Gregory M. Doudnikoff; Andrew J. Dillon

[57]             ABSTRACT

Method for automatically generating an implementation of input and output container reusable parts for a process model managed and executed by at least one computer system. The method of generating uses the specification of a process model extended by specifications associating the process model to a reusable part environment outside the workflow process environment and generates an implementation of said input and output containers as reusable parts residing within said reusable parts environment. The method of generating comprises an analysis of the specifications of said process model. Based on this analysis the method generates the associated input container reusable parts and associated output container reusable parts as implementations of said input and output containers.

20 Claims, 12 Drawing Sheets

```
1 STRUCTURE 'CreditInfo'
2    'CreditRequestor':  'PersonInfo';
3    'Address':   STRING DESCRIPTION 'Address' ;
4    'RiskFactor':       STRING DESCRIPTION 'Risk Factor' ;
5    'AddApproval':      STRING DESCRIPTION 'Add Approval' ;
6    'CreditAmount':     LONG DESCRIPTION 'Credit Amount' ;

7    PART TYPE_OUT
8        MEMORY_OPTIMIZATION
9        PART_DESCRIPTION 'Credit Info Out'
10       HEADER_FILE 'crinfout'
11       PART_FILE 'CRINFO'
12       ICON_ID 4712
13       ICON_DLL 'cricon'

14 END 'CreditInfo'

15 STRUCTURE 'PersonInfo'
16   'FirstName':   STRING DESCRIPTION 'First Name' ;
17   'LastName':    STRING DESCRIPTION 'Last Name' ;

18   PART TYPE_IN
19       MEMORY_OPTIMIZATION
20       PART_DESCRIPTION 'Person Info In'
21       HEADER_FILE 'peinfin'
22       PART_FILE 'PERSINFO'
23       ICON_ID 4711
24       ICON_DLL 'persicon'

25 END 'PersonInfo'
```

Fig. 1

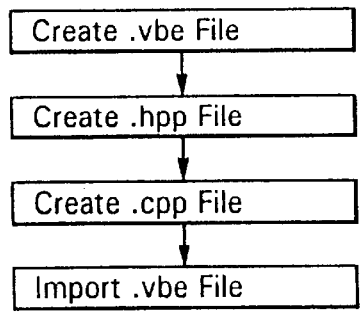

Fig. 2

```
 1//VBBeginPartInfo: PersonInfoIn,"Person Info In"
 2//VBParent: IStandardNotifier
 3//VBIncludes: "Peinfin.hpp" _PERSONINFO_IN_
 4//VBPartDataFile: PERSINFO.VBB
 5//VBConstructor: PersonInfoIn( )
 6//VBComposerInfo: nonvisual
 7//VBAttribute: FirstName,
 8//VB:         "First Name",
 9//VB:         IString,
10//VB:         IString FirstName( ) const
11//VBAttribute: LastName,
12//VB:         "Last Name",
13//VB:         IString,
14//VB:         IString LastName( ) const
15//VBAttribute: ProcessName,
16//VB:         "Process Name",
17//VB:         IString,
18//VB:         IString ProcessName( ) const
19//VBAttribute: ActivityName,
20//VB:         "Activity Name",
21//VB:         IString,
22//VB:         IString ActivityName( ) const
23//VBPreferredFeatures: FirstName, LastName
24//VBEndPartInfo: PersonInfoIn
```

*Fig. 4*

```
 1//VBBeginPartInfo: CreditInfoOut,"Credit Info Out"
 2//VBParent: IStandardNotifier
 3//VBIncludes: "crinfout.hpp" _CREDITINFO_OUT_
 4//VBPartDataFile: CREDINFO.VBB
 5//VBConstructor: CreditInfoOut( )
 6//VBComposerInfo: nonvisual
 7//VBAttribute: FirstName,
 8//VB:        "First Name",
 9//VB:        IString,,
10//VB:        virtual CreditInfoOut& setFirstName
11//VB:              (const IString& aFirstName),
12//VB:        FirstNameId
13//VBAttribute: LastName,
14//VB:        "Last Name",
15//VB:        IString,,
16//VB:        virtual CreditInfoOut& setLastName
17//VB:              (const IString& aLastName),
18//VB:        LastNameId
19//VBAttribute: Address,
20//VB:        "Address",
21//VB:        IString,,
22//VB:        virtual CreditInfoOut& setAddress
23//VB:              (const IString& anAddress),
24//VB:        AddressId
25//VBAttribute: RiskFactor,
26//VB:        "Risk Factor",
27//VB:        IString,,
28//VB:        virtual CreditInfoOut& setRiskFactor
29//VB:              (const IString& aRiskFactor),
30//VB:        RiskFactorId
31//VBAttribute: AddApproval,
32//VB:        "Additional Approval",
33//VB:        IString,,
34//VB:        virtual CreditInfoOut& setAddApproval
35//VB:              (const IString& anAddApproval),
36//VB:        AddApprovalId
37//VBAttribute: CreditAmount,
38//VB:        "Credit Amount",
39//VB:        long,,
40//VB:        virtual CreditInfoOut& setCreditAmount
41//VB:              (const long aCreditAmount),
42//VB:        CreditAmountId
43//VBPreferredFeatures: FirstName, LastName, Address,
44//VB:                  RiskFactor, AddApproval, CreditAmount
45//VBEndPartInfo: CreditInfoOut
```

*Fig. 5*

```
1 #ifndef _PERSONINFO_IN_
2 #define _PERSONINFO_IN_

3 #ifndef _ISTRING_
4    #include <istring.hpp>
5 #endif

6 #ifndef _ISTDNTF_
7    #include <istdntfy.hpp>
8 #endif

9 #pragma pack(4)

10 class PersonInfoIn : public IStandardNotifier

11 {

12    public :

13       PersonInfoIn ( ) ;
14       virtual PersonInfoIn ( ) ;

15       virtual IString FirstName ( ) const ;
16       virtual IString LastName ( ) const ;
17       virtual IString ProcessName ( ) const ;
18       virtual IString ActivityName ( ) const ;

19    private :

20       IString iFirstName ;
21       IString iLastName ;
22       IString iProcessName ;
23       IString iActivityName ;

24 } ;

25 #pragma pack( )

26 #endif
```

*Fig. 6*

```
1  #ifndef _CREDITINFO_IN_
2  #define _CREDITINFO_IN_
3  #ifndef _ISTRING_
4    #include <istring.hpp>
5  #endif
6  #ifndef _ISTDNTF_
7    #include <istdntfy.hpp>
8  #endif
9  #pragma pack(4)
10 class CreditInfoOut : public IStandardNotifier
11 {
12   public :
13     CreditInfoOut ( ) ;
14     virtual CreditInfoOut ( ) ;
15     virtual CreditInfoOut& setFirstName
16                 (const IString& aFirstName) ;
17     virtual CreditInfoOut& setLastName
18                 (const IString& aLastName) ;
19     virtual CreditInfoOut& setAddress
20                 (const IString& aAddress) ;
21     virtual CreditInfoOut& setRiskFactor
22                 (const IString& aRiskFactor) ;
23     virtual CreditInfoOut& setAddApproval
24                 (const IString& aAddApproval) ;
25     virtual CreditInfoOut& setCreditAmount
26                 (const long aCreditAmount) ;
27     static INotificationId const FirstNameId ;
28     static INotificationId const LastNameId ;
29     static INotificationId const AddressId ;
30     static INotificationId const RiskFactorId ;
31     static INotificationId const AddApprovalId ;
32     static INotificationId const CreditAmountId ;
33   private :
34     IString iFirstName ;
35     IString iLastName ;
36     IString iAddress ;
37     IString iRiskFactor ;
38     IString iAddApproval ;
39     long iCreditAmount ;
40     char  iFirstNameInd ;
41     char  iLastNameInd ;
42     char  iAddressInd ;
43     char  iRiskFactorInd ;
44     char  iAddApprovalInd ;
45     char  iCreditAmountInd ;
46 } ;
47 #pragma pack( )
48 #endif
```

Fig. 7

```
1 #ifndef _PERSONINFO_IN_
2   #include <peinfin.hpp>
3 #endif
4 #include <os2.h>
5 #include <string.h>
6 #include <stdio.h>
7 #include "exmpjapc.h"
8 #include "exmvap.hpp"
9 PersonInfoIn: :PersonInfoIn ( ) : IStandardNotifier( )
10 {
11    returnCode = exmqstr (pSess,
12                          EXMPJ_INPUT_CTNR,
13                          0,
14                          0,
15                          &containerLength) ;
16    containerArea = new char [containerLength] ;
17    returnCode = exmqstr (pSess,
18                          EXMPJ_INPUT_CTNR,
19                          containerLength,
20                          containerArea,
21                          &containerLength) ;
22    returnCode = exmgtci (pSess,
23                          "_PROCESS",
24                          0,
25                          0,
26                          &itemLength) ;
27    itemArea = new char [itemLength] ;
28    returnCode = exmgtci (pSess,
29                          "_PROCESS",
30                          itemLength,
31                          (void*)itemArea,
32                          &itemLength) ;
33    iProcessName = itemArea ;
34    delete [ ] itemArea ;
35    returnCode = exmgtci (pSess,
36                          "_ACTIVITY",
37                          0,
38                          0,
39                          &itemLength) ;
40    itemArea = new char [itemLength] ;
41    returnCode = exmgtci (pSess,
42                          "_ACTIVITY",
43                          itemLength,
44                          (void*)itemArea,
45                          &itemLength) ;
46    iActivityName = itemArea ;
47    delete [ ] itemArea ;
48    returnCode = exmgtci (pSess,
49                          "FirstName",
50                          0,
51                          0,
52                          &itemLength) ;
53    itemArea = new char [itemLength] ;
```

*Fig. 8a*

```
1   returnCode = exmgtci (pSess,
2                        "FirstName",
3                        itemLength,
4                        (void*)itemArea,
5                        &itemLength) ;
6   if (returnCode = = EXMPJ_ITEM_NOT_SET) {
7      iFirstName = "" ;
8   } else {
9      iFirstName = itemArea ;
10  }
11  returnCode = exmgtci (pSess,
12                       "LastName",
13                       0,
14                       0,
15                       &itemLength) ;
16  itemArea = new char [itemLength] ;
17  returnCode = exmgtci (pSess,
18                       "LastName",
19                       itemLength,
20                       (void*)itemArea,
21                       &itemLength) ;
22  if (returnCode = = EXMPJ_ITEM_NOT_SET) {
23     iLastName = "" ;
24  } else {
25     iLastName = itemArea ;
26  }
27}
28PersonInfoIn: :PersonInfoIn ( )
29{
30}
31String PersonInfoIn: :FirstName ( ) const
32{
33   return (iFirstName) ;
34}
35String PersonInfoIn: :LastName ( ) const
36{
37   return (iLastName) ;
38}
39String PersonInfoIn: :ProcessName ( ) const
40{
41   return (iFirstName) ;
42}
43String PersonInfoIn: :ActivityName ( ) const
44{
45   return (iLastName) ;
46}
```

Fig. 8b

```
1 #ifndef _CREDITINFO_OUT_
2   #include <crinfout.hpp>
3 #endif

4 #ifndef _INOTIFEV_
5   #include <inotifev.hpp>
6 #endif

7 #include <os2.h>
8 #include <string.h>
9 #include <stdio.h>
10 #include "exmpjapc.h"
11 #include "exmvap.hpp"
12 const INotificationId CreditInfoOut: :FirstNameId =
13                      "CreditInfoOut: :FirstName" ;
14 const INotificationId CreditInfoOut: :LastNameId =
15                      "CreditInfoOut: :LastName" ;
16 const INotificationId CreditInfoOut: :AddressId =
17                      "CreditInfoOut: :Address" ;
18 const INotificationId CreditInfoOut: :RiskFactorId =
19                      "CreditInfoOut: :RiskFactor" ;
20 const INotificationId CreditInfoOut: :AddApprovalID =
21                      "CreditInfoOut: :AddApproval" ;
22 const INotificationId CreditInfoOut: :CreditAmountId =
23                      "CreditInfoOut: :CreditAmount" ;
24 CreditInfoOut: :CreditInfoOut ( ) : IStandardNotifier( )
25 {
26   iFirstNameInd = 0 ;
27   iLastNameInd = 0 ;
28   iAddressInd = 0 ;
29   iRiskFactorInd = 0 ;
30   iAddApprovalInd = 0 ;
31   iCreditAmountInd = 0 ;
32 }
33 CreditInfoOut: :CreditInfoOut ( )
34 {
35   if (iFirstNameInd) {
36     returnCode = exmstci (pSess,
37                      "CreditInfo.FirstName",
38                      iFirstName.length( ) + 1,
39                      (char*)iFirstName) ;
40   }
41   if (LastNameInd) {
42     returnCode = exmstci (pSess,
43                      "CreditInfo.LastName",
44                      iLastName.length( ) + 1,
45                      (char*)iLastName) ;
46   }
47   if (iAddressInd) {
48     returnCode = exmstci (pSess,
49                      "Address",
50                      iAddress.length( ) + 1,
51                      (char*)iAddress) ;
52   }
53   if (iRiskFactorInd) {
54     returnCode = exmstci (pSess,
55                      "RiskFactor",
56                      iRiskFactor.length( ) + 1,
57                      (char*)iRiskFactor) ;
58   }
59   if (iAddApprovalInd) {
60     returnCode = exmstci (pSess,
61                      "AddApproval",
62                      iAddApproval.length( ) + 1,
63                      (char*)iAddApproval) ;
64   }
65 }
```

*Fig. 9a*

```
1   if (iCreditAmountInd) {
2     returnCode = exmstci (pSess,
3                           "CreditAmount",
4                           4,
5                           &iCreditAmount) ;
6   }
7 }
8 CreditInfoOut& CreditInfoOut: :setFirstName
9                              (const IString& aFirstName)
10 {
11   if (iFirstName != aFirstName)
12   {
13     iFirstName = aFirstName ;
14     iFirstNameInd = 1;
15     IString eventData(iFirstName) ;
16     notifyObservers(INotificationEvent (FirstNameId,
17                                         *this,
18                                         true,
19                                         (void*)&eventData)) ;
20   }
21   return (*this) ;
22 }
23 CreditInfoOut& CreditInfoOut: :setLastName
24                              (const IString& aLastName)
25 {
26   if (iLastName != aLastName)
27   {
28     iLastName = aLastName ;
29     iLastNameInd = 1;
30     IString eventData(iLastName) ;
31     notifyObservers(INotificationEvent (LastNameId,
32                                         *this,
33                                         true,
34                                         (void*)&eventData)) ;
35   }
36   return (*this) ;
37 }
38 CreditInfoOut& CreditInfoOut: :setAddress
39                              (const IString& aAddress)
40 {
41   if (iAddress != aAddress)
42   {
43     iAddress = aAddress ;
44     iAddressInd = 1;
45     IString eventData(iAddress) ;
46     notifyObservers(INotificationEvent (AddressId,
47                                         *this,
48                                         true,
49                                         (void*)&eventData)) ;
50   }
51   return (*this) ;
52 }
53 CreditInfoOut& CreditInfoOut: :setRiskFactor
54                              (const IString& aRiskFactor)
55 {
56   if (iRiskFactor != aRiskFactor)
57   {
58     iRiskFactor = aRiskFactor ;
59     iRiskFactorInd = 1;
60     IString eventData(iRiskFactor) ;
61     notifyObservers(INotificationEvent (RiskFactorId,
62                                         *this,
63                                         true,
64                                         (void*)&eventData)) ;
65   }
66   return (*this) ;
67 }
```

*Fig. 9b*

```
1  CreditInfoOut& CreditInfoOut: :setAddApproval
2                           (const IString& aAddApproval)
3  {
4     if (iAddApproval != aAddApproval)
5     {
6        iAddApproval = aAddApproval ;
7        iAddApprovalInd = 1;
8        IString eventData(iAddApproval) ;
9        notifyObservers(INotificationEvent (AddApprovalId,
10                                    *this,
11                                    true,
12                                    (void*)&eventData)) ;
13    }
14    return (*this) ;
15 }
16 CreditInfoOut& CreditInfoOut: :setCreditAmount
17                           (const long aCreditAmount)
18 {
19    if (iCreditAmount != aCreditAmount)
20    {
21       iCreditAmount = aCreditAmount ;
22       iCreditAmountInd = 1;
23       IString eventData(iCreditAmount) ;
24       notifyObservers(INotificationEvent (CreditAmountId,
25                                    *this,
26                                    true,
27                                    (void*)&eventData)) ;
28    }
29    return (*this) ;
30 }
```

*Fig. 9c*

METHOD OF GENERATING AN IMPLEMENTATION OF REUSABLE PARTS FROM CONTAINERS OF A WORKFLOW PROCESS-MODEL

BACKGROUND OF THE INVENTION

1. Technical Field

The present invention relates to the technical field of process management and workflow environments on computer systems. More specifically, the present invention relates to an extension of a workflow environment and combining it with a reusable parts environment, both environments residing and being executable on a computer system.

2. Description of the Related Art

The processes of designing, developing and manufacturing a new product or changing an existing product presents many challenges to product managers and engineers who must bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support in the design effort. Furthermore, they require planning and control of product information through design, release, and manufacturing.

The correct and efficient execution of business processes within a company, e. g. development or production processes, is of enormous importance for a company and has significant influence on a company's overall success in the market place. Therefore, those processes have to be regarded similarly to technology processes and must be tested, optimized and monitored. The management of such processes is usually performed and supported by a computer based process or workflow management system.

In D. J. Spoon: "Project Management Environment", IBM Technical Disclosure Bulletin, Vol. 32, No. 9A, February 1990, pages 250 to 254, a process management environment is described including an operating environment, data elements, and application functions and processes.

In R. T. Marshak: "IBM's FlowMark, Object-Oriented Workflow for Mission-Critical Applications", Workgroup Computing Report (USA), Vol. 17, No. 5, 1994, page 3 to 13, the object character of IBM FlowMark as a client/server product built on a true object model that is targeted for mission-critical production process application development and deployment is described.

In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modelling for customization and changes are described.

In F. Leymann and D. Roller: "Business Process Management with FlowMark", Digest of papers, Cat. No. 94CH3414-0, Spring COMPCON 94, 1994, pages 230 to 234, the state-of-the-art computer process management tool, IBM FlowMark is described. The meta model of IBM FlowMark is presented as well as the implementation of IBM FlowMark. The possibilities of IBM FlowMark for modelling of business processes as well as their execution are discussed. The product IBM FlowMark is available for different computer platforms and documentation for IBM FlowMark is available in every IBM branch.

In F. Leymann: "A meta model to support the modelling and execution of processes", Proceedings of the 11th European Meeting on Cybernetics and System Research EMCR92, Vienna, Austria, Apr. 21 to 24, 1992, World Scientific 1992, pages 287 to 294, a meta model for controlling business processes is presented and discussed in detail.

The "IBM FlowMark for OS/2", document number GH 19-8215-01, IBM Corporation, 1994, available in every IBM sales office, represents a typical modern, sophisticated, and powerful workflow management system. It supports the modelling of business processes as a network of activities. This network of activities, the process model, is constructed as a directed, acyclic, weighted, colored graph. The nodes of the graph represent the activities which are performed. The edges of the graph, the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e. g. by assigning tasks to a work list according to the respective person, wherein said work list is stored as digital data within said workflow or process management computer system.

In F. Leymann and W. Altenhuber: "Managing business processes as an information resource", IBM Systems Journal, Vol. 32(2), 1994, the mathematical theory underlying the IBM FlowMark product is described.

In D. Roller: "Verification of Workflows in IBM FlowMark", in J. Becker und G. Vossen (Hrsg.): "Geschaeftsprozessmodellierung und Workflows", International Thompson Publishing, 1995, the requirement and possibility of the verification of workflows is described. Furthermore the feature of graphical animation for verification of the process logic is presented as it is implemented within the IBM FlowMark product.

For implementing a computer based process management system, the business processes have to be analyzed and, as the result of this analysis, a process model has to be constructed as a network of activities corresponding to the business process. In the IBM FlowMark product, the process models are not transformed into an executable. At run time, an instance of the process is created from the process model, called a process instance. This process instance is then interpreted dynamically by the IBM FlowMark product.

A previous patent application of the same applicant, application number PCT/EP 95/03345, titled "Method and Computer System For Generating Process Management Computer Programs From Process Models", teaches how a process graph can be transformed into a C++ program, if the process is consecutively executed by one user at a time at one location.

A further patent application of the same applicant, application number EP 96 105 010.1, titled "Method of Generating an Implementation of a Workflow Process Model in an Object Environment", teaches how to provide a new kind of extension for a process model within a workflow environment, triggering an automatic and computerized generation of an implementation of said process model within an object environment. Said implementation of said process model being executable on a computer system.

The technological area of reusable parts environments has become known for instance by the VisualAge product family offered by IBM. Detailed information on the principles and concepts of VisualAge can be found in various publications available through IBM branch offices. Examples are: "VISUALAGE: CONCEPTS AND FEATURES", document number GG24-3946-00, "VISUALAGE PROGRAMMER'S GUIDE TO BUILDING PARTS FOR FUN AND PROFIT", document number SC34-4496-01, "VISUALAGE C++ FOR OS/2 V3.0", document number GCO9-2235-00 and many more. Reusable parts environments support the building of new software from components. According to the component paradigm new composite components may be built by other components allowing the creation of building blocks of increasing complexity and abstraction. VisualAge's visual programming tools allow applications to be composed, customized, and assembled in a visual way by using a graphical editor. By allowing the combination of parts visually, without writing procedural code, the visual tools take away much of the tedium and error-prone details of application programming, especially user interface programming, allowing concentration on the essential capabilities of an application.

Construction from parts refers to the ability to create application programs by combining existing software components rather than creating the logic of an application from scratch.

Currently workflow process environments, like FlowMark, are separate environments without any relation to the-reusable part environments, like VisualAge. Also the visual programming capabilities available within reusable parts environments are not available within workflow process environments.

SUMMARY OF THE INVENTION

It is therefore one object of the present invention to provide a new kind of extension of a process model within a workflow environment, triggering for an interface container (input or output container) of said process model an automatic and computerized generation of an implementation of said interface container as a reusable part within a reusable parts environment. Said implementation being executable on a computer system.

It is another object of the invention to endow the input and output containers with visual programming capabilities.

The present invention teaches a method of extending the specifications of a process model within a workflow process environment, wherein said process model defines a process activity managed and executed by at least one computer system. The method of extending links the process model with a reusable part environment within which input and output containers of said process activity are to be implemented as reusable parts. This link is realized by a step of associating the process model with an input container reusable part and an output container reusable part residing within the reusable part environment and implementing said input and output containers.

Based on these extensions of the specification of a process model the gap between two different and separate environments, a workflow process environment and a reusable part environment, has been filled. According the current invention a seamless transition is feasible now.

As a further advantage, the extended specification represents a unified modelling environment of process models independent from their actual implementations. Thus the extended specification allows focus on the most important task, the specification of workflow process models, independent from their actual implementation, which according the current invention can be realized within a reusable part environment.

According to a further embodiment of the proposed invention the method of extending also associates reusable part names, descriptive information, header and implementation file names, reusable part information file names and optimization targets for the input and output container reusable parts.

Due to this approach all relevant process model information, and the information relating to an environment outside of the workflow process environment, are kept and maintained in a single place avoiding the problem of the administration of information spread over various environments. Also due to this approach, it becomes possible to exploit this comprehensive information to generate the associated input and output container reusable parts.

The current invention also teaches a computerized method for automatically generating an implementation of input and output container reusable parts for a process model managed and executed by at least one computer system. The method of generating uses the specification of a process model extended by specifications associating the process model to a reusable part environment outside the workflow process environment and generates an implementation of said input and output containers as reusable parts residing within said reusable parts environment. The method of generating comprises an analysis of the specifications of said process model. Based on this analysis the method generates the associated input container reusable parts and associated output container reusable parts as implementations of said input and output containers.

It is advantageous that all the specifications available within the workflow process environment can be exploited and are sufficient for automatically generating the implementation structures located outside the process model environment. No error-prone human intervention is required to establish the input and output container reusable parts. Furthermore, due to the automatism of the method no further knowledge on the peculiarities of the reusable part environment is required for establishing said reusable parts. As a consequence, process modeling within the workflow process environment represents a unified modelling environment independent from the actual implementations of the process model. Thus, users of the invention may focus on the most important task, the specification of workflow process models, independent from their actual implementation, which according the current invention may be generated automatically.

According to a further embodiment of the proposed invention the method is able to generate the input and output container reusable parts in optimized realizations. Depending on what is more important, memory usage or processing speed of the generated reusable parts, different implementations can be generated.

According to a further embodiment of the proposed invention the method generates in a further step the attribute names and the attributes themselves of the input and output container reusable parts.

It is very time consuming to create these variables if not supported by an automatic process. Also this task typically is very error-prone if not accomplished by such a kind of automatism.

According to a further embodiment of the proposed invention the method generates in a further step, get and set methods for all generated attributes of the input and output container reusable parts, respectively. Moreover, constructor and destructor methods can be generated automatically to create/remove object instances of the input and output container reusable parts.

By being able to generate the constructor and destructor methods, the proposed teaching is able to deliver ready-to-use reusable parts not requiring additional human intervention. As the constructor and destructor methods automatically and transparently are enabled to transfer the attribute values between the generated input container reusable parts, the generated output container reusable parts and the input containers and output containers residing within the workflow environment, a seamless integration of the reusable parts environment and the workflow process environment has been achieved.

According to a further embodiment of the proposed invention the automatism of the generating method is driven to perfection as also various file names being of importance for the implementations of the input and output container reusable parts such as the file names of the reusable part information files, the header files, the implementation files and so forth are deduced from the process model specification, and the corresponding files are created. In a final step, the generated reusable part information files of the generated input and output container reusable parts are imported into the reusable parts environment, thus making the reusable parts known to the reusable parts environment and thus allowing exploitation of the generated reusable parts directly after the generation step without any further activities or configuration steps.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a diagram illustrating the specification of data structures which define an input container and an output container together with the association to respective reusable parts implementing said input container and said output container in the reusable parts environment;

FIG. 2 is a diagram depicting steps in generating input container reusable parts and output container reusable parts;

FIG. 4 illustrates a generated part information file of a generated input container reusable part for the credit application example;

FIG. 5 illustrates a generated part information file of a generated output container reusable part for the credit application example;

FIG. 6 shows the generated header file of a generated input container reusable part based on an analysis of a FlowMark Definition File of the credit application process model;

FIG. 7 shows the generated header file of a generated output container reusable part based on an analysis of a FlowMark Definition File of the credit application process model;

FIG. 8a/b shows the generated C++ implementation file of a generated input container reusable part based on an analysis of a FlowMark Definition File of the credit application process model;

FIG. 9a/b/c shows the generated C++ implementation file of a generated output container reusable part based on an analysis of a FlowMark Definition File of the credit application process model.

DETAILED DESCRIPTION OF ILLUSTRATIVE EMBODIMENT

Introduction

Figure 3:
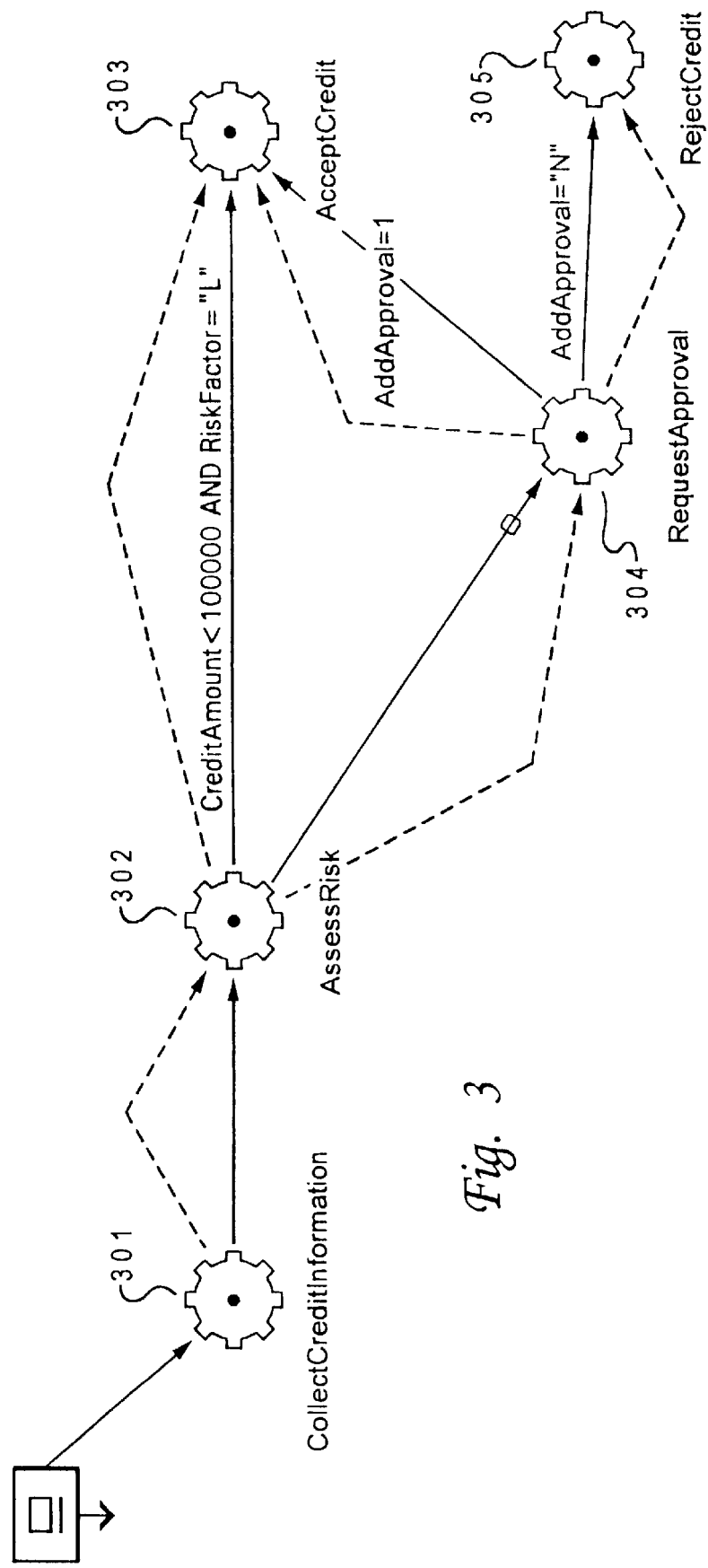
FIG. 3 shows an example process model representing a model of a credit application process.

The following description of the invention is based on IBM's FlowMark workflow manager. Without any limitation of the scope of the invention any other workflow manager may be used instead for an implementation of the invention.

Similarly, the preferred embodiment of the current invention is targeted towards IBM's VisualAge product family as a reusable parts environment for which the reusable parts implementations are generated. Again this choice of a reusable parts environment does not limit the scope of the invention. The proposed methods are applicable to any other potential reusable parts environment. Another example of a reusable parts environment would be VisualBasic for instance. In the following the term "reusable part" and "part" are used interchangeably.

Even though the reusable parts are generated as one or more interacting object structures in one of the known object-oriented programming languages, the same results can be achieved if the reusable parts were generated in any procedural programming languages.

In the technical field of object oriented programming, the term "object" is sometimes used in a wide sense, designating an object-class, and sometimes is used in a narrow sense, designating an instance of a class of objects. Also the term "object" might be used to designate an instance of a class-object. Depending on the context in which the term is used it will be obvious to which of the various meanings the term refers to.

The current invention generates the reusable parts as object structures within the VisualAge reusable parts environment as C++ programs. The teaching of the current invention is of general nature and therefore the generation process may create these reusable parts in any programming language; an example would be the Smalltalk programming language also supported by VisualAge.

If in the current application the notion of a file with a file name is used is does not necessarily refer to a single named data set in a file system of a computer system. The notion of a file with a file name may also refer to a named, unique and identifiable part of a larger data set.

The current invention teaches two methodologies, one method for extending the specifications of a process model by associations with input and output container reusable parts and one method of generating an implementation of said input and output container reusable parts. Each of these methods may be applied alone or in combination with one another.

The preferred embodiment of the current invention is to choose the approach of extending the specifications of a process model within a workflow environment, linking the process model with a reusable part environment, and to use these specification for generating input and/or output containers as reusable parts residing within the reusable parts environment. Of course the role of the workflow environment and the reusable parts environment might be reversed in so far as specifications residing within the reusable parts environment might be extended, associating with it a process model residing within a workflow environment. Using this type of specification extension, the input and/or output containers as reusable parts residing within the reusable parts environment could then be generated.

Moreover, the current description distinguishes between input and output containers. Of course the whole teaching of the current invention is also applicable to the case that only an input container or only an output container or even only a combined input/output container is known within the workflow environment. The current invention is also applicable to workflow environments independent from the granularity of the activity the containers are associated to. For instance these containers might be associated to a process activity or to a whole process or to other types of granularity.

Concepts

The IBM FlowMark family implements a workflow manager. It supports the modelling of business processes as a network of activities. This network of activities is constructed as a directed, acyclic, weighted, colored graph. The nodes of the graph represent the activities which are performed. The edges of the graph describe the potential sequence of execution of the activities. Definition of the process graph is via the IBM FlowMark Definition Language (FDL) or the built-in graphical editor. The runtime component of the workflow manager interprets the process graph and distributes the execution of activities accordingly.

IBM FlowMark also implements the construct of a program activity. The program activity references a program object, which provides information about the program, such as invocation mechanism, program executable name, input and output data structures, and execution environment. This information is used to invoke the program associated with the program activity. Thus the program object is the link between the definition of the program activity, i.e. the process model, and the executable program implementing this activity. Of course the activity may be executed within a separate process or a sub-process. Such an activity may be implemented in any programming language; some well-known and widely used examples are: VisualBasic, C, C++, REXX, and Smalltalk.

Each activity, in terms of the workflow-environment, may have so-called input and/or output containers associated with it. The input container contains the context information for the activity implementation. It can be accessed by the associated program via the workflow-environment supplied application programming interface. The output container allows the program to store process-relevant information; access to the output container is also possible via the application programming interface.

The Visual Builder of the VisualAge product family allows the construction of applications from existing, reusable software components called reusable parts (parts). VisualAge's visual programming tools allow applications to be composed, customized, and assembled in a visual way by using a graphical editor. By allowing the combination of parts visually, without writing procedural code, the visual tools take away much of the tedium and error-prone details from application programming, especially user interface programming, allowing concentration on the essential capabilities of an application. Therefore construction from parts refers to the ability to create application programs by combining existing software components rather than creating the logic of the application from scratch.

To be able to serve the above mentioned purposes parts not only implement the function and services to be delivered to the overall application. To participate within the reusable parts environment and to support the visual programming capabilities, parts are in addition endowed with the required development accessories.

Parts are either visual or nonvisual. Visual parts allow the application developer to easily construct sophisticated graphical end user interfaces; nonvisual parts provide programming constructs for any kind of basic functions such as accessing a database or maintaining a list of text strings and so forth.

The described methods of the invention teach how the FlowMark process model can be extended to support the generation of the implementation of input and output containers as reusable-parts. These generated reusable-parts for input and output containers then allow access to container fields by simply making connections. The actual reading and writing of the container information is performed transparently by the part. This allows application developers to easily create workflow-based applications using VisualAge as the program development tool.

A. The FlowMark Container Concept

The following short description of FlowMark containers, data structures and their association to activities should help to improve the reader's understanding of the proposed teaching of the current application. The appropriate IBM FlowMark literature should be contacted for details; for instance: "FLOWMARK PROGRAMMING GUIDE", document number SH19-8177-00.

As already pointed out, each program activity may be associated with an input container and an output container. Each container consists of three basic sets of predefined data structures and a data structure selected by the process modeler to be associated with the container.

Data structures are made up of data members. A data member is any one of the basic types STRING, LONG, DOUBLE or any other data structure. A data member may also be an array.

An example reflecting these aspects may be found in FIG. 1.

B. The VisualAge Part Concept

The following short description of VisualAge parts should help, in addition to the information given above, to provide a better understanding of the proposed teaching of the current application. The appropriate IBM VisualAge literature should be contacted for details; for instance "IBM VISUALAGE VISUAL BUILDER USER'S GUIDE", document number S25H-6960-00, or "IBM VISUALAGE C++ VISUAL BUILDER PARTS FOR FUN AND PROFIT", document number S25H-6968-00.

In VisualAge a reusable part, or part for short, is a class with a well-defined public interface, which supports a simple and architectured messaging protocol. Parts can be composed of other parts building so-called "composite" parts. Parts can be very simple or highly sophisticated to provide a wide range of functions. Parts, for instance, can be as simple as a text-entry field or a default window. Often parts are composed of multiple, interacting sub-parts. Thus, they can be more complex, such as a person view that may include multiple text-entry fields for names and telephone numbers and, possibly, views for addresses. Furthermore, they can be as highly complex as a mail system, for instance, or as a protocol-independent client/server component. Parts can also represent (wrap) programs written in COBOL or C language, thus allowing the re-use of existing code in a construction from parts paradigm.

A VisualAge part in VisualAge C++ is a software object implemented as a C++ class which supports a simple, standardized protocol. This protocol supports the interconnection of parts to form higher-function parts or entire applications. The part interface is composed of three distinct features attributes, actions and events. These features correspond to a natural way of viewing parts (and objects in general) in terms of what properties (attributes) they have, what behaviors (actions) they can perform, and what unsolicited information (events) they can notify other parts about. Thus the public interface of parts introduces a natural way of seeing parts and objects in general, and expresses the possible interactions among objects.

Attributes are the logical properties of parts. At a conceptual level, attributes are an important and integral aspect of the objects' semantic definitions. Attributes are objects that the part can return or set upon request. The part may also need to signal other parts that the attribute has been changed.

Actions are the behaviors of the parts, which means the services or operations the part may be requested to perform.

Events provide a notification mechanism. They are used to signal that something has happened to the part. For user interface (UI) parts, they are often related to some user interaction, such as the clicking of the mouse on a push button, the selection of a check box, the opening of a window, and so on. Events are used to trigger an action. As an example, a detail window could be shown whenever the user selects an item in a list box.

A part is made up of a header file and a code file for a C++ class that supports the parts architecture. The part's interface must be made known to the Visual Builder either via the built-in parts editor or via a part information file (.vbe) file. This file must be imported into the visual builder.

The Basic Ideas of the Preferred Embodiment

According to the teaching of the current invention an input container reusable part and/or an output container reusable part is created for each data structure defined within the FlowMark definition of a certain process model. For that purpose a new association mechanism for associating a data structure to a reusable part is to be added to the FlowMark Definition Language as a set by additional specifications. FIG. 1, lines 7–13 and lines 18–24 show such an extension. In particular, the data structure information is augmented by the predefined field information added to extend the data structure information with respect to reusable parts and added to control the reusable part generation process of the input and output container.

Based on this information included in the FlowMark definition files, input and output reusable parts are generated according to the teaching of the current invention. In an overall view this generation of a part encompasses for each part:

a. generation of a .hpp file for the header information b. generation of a .cpp file for the part implementation, c. generation of a .vbe file for the part information file, d. and importing of the part information file into the reusable parts environment to be make the newly generated part known and available to the system.

FIG. 2 shows the steps involved in creating a VisualAge part according to the current invention.

When creating an input container reusable part, the following detailed steps are performed. Each of these steps might contribute definitions to any of above mentioned files:

a. For each field in the data structure found in the FlowMark definition file, an attribute name is created. The name of the attribute is the name of the field. In the case of nested data structures the name is constructed by prefixing the field name with the names of the data structures in the path. Field type and length are taken from the field information in the data structure.

b. For each field in the predefined data structures contained in the input container, an attribute is created for storing the attribute's value.

c. A get method is created for each attribute. No set method is created for the attributes, as there is no requirement to set the values of the fields in the input container. Of course if necessary a similar set method could be generated too.

The generation process can be directed to create methods realizing different processing objectives. According the current implementation the generation method can be optimized for memory consumption or for speed of processing. If the part is optimized for speed, the get method fetches the appropriate field value via the application programming interface and stores it in the attribute. If the field has no value, the attribute is populated with a default value.

d. A constructor (in the sense of object oriented principles) is created for the part. It obtains the container (the container instance residing within the workflow process environment) via the appropriate programming interface calls. If optimized for memory, it then fetches all field values via the application program interface and stores the values in the attributes so that they can be accessed using the get methods. If the field has no value, the attribute is populated with a default value.

When creating-an output container reusable part, the following detailed steps are performed. Each of these steps might contribute definitions to any of above mentioned files:

a. For each field in the data structure found in the FlowMark definition file, an attribute name is created. The name of the attribute is the name of the field. In the case of nested data structures the name is constructed by prefixing the field name with the names of the data structures in the path. Field type length are taken from the field information in the data structure.

b. For each field in the predefined data structures contained in the output container, an attribute is created.

c. A set method is created for each attribute. No get method is created for the attributes, as there is not need to get the values from the output container. Of course if necessary a similar get method could be generated too. A notification is sent out if the value of an attribute is set to inform other parts interested in this new value on the modification event.

d. A constructor (in the sense of object oriented principles) is created for the part. The purpose is to set a control indicator for each attribute which is used to determine whether a value has been supplied for the attribute via the attribute's set method.

e. A destructor (in the sense of object oriented principles) is created for the part. It stores the values of all attributes in the output container (the container instance residing in the workflow process environment) via the FlowMark application programming interface. Only those attributes which a value has been set are stored in the output container instance residing in the workflow process environment.

Process Model Additions and Implementation

This section describes in detail the extensions of the FlowMark definition language, i.e. the extensions added to FlowMark definition files, which control the reusable part generation process;

the specifications and definitions to be generated and to be introduced to a part information file (.vbe) (refer to FIG. 2), the .vbe file allows the generated part to be introduced to the reusable parts environment;

the specifications and definitions to be generated and to be introduced to a header file (.hpp) (refer to FIG. 2), the .hpp file allowing others to make use of the generated reusable part;

the specifications and definitions to be generated and to be introduced to a implementation file (.cpp) (refer to FIG. 2), the .cpp file implementing the generated reusable part.

The subsequent description is based on an example of a certain process model depicted in FIG. 3. The example process model represents a model of a credit application process. FIG. 3 shows various process steps 301–305 together with various predicate conditions which have to be fulfilled before FlowMark starts the next step in the process model.

A. Process Model Additions

The current section discusses the extension and association method of the FlowMark Definition Language allowing the reusable part generation process to generate the input and output container reusable parts. The method optionally requires additional information to properly generate the information required by VisualAge. The data can be acquired in multiple ways. It can be collected by the computer system implementing the method. Alternatively, the process meta model can be extended to accommodate the data. Both approaches have their pros and cons. From an overall integration perspective, the extension of the process model is the desired solution as the data is stored in one location and can be easily exchanged via FlowMark Definition Language. Consequently, the required extensions are described as extensions to the FlowMark Definition Language.

The following specifications relate to FIG. 1 showing the data structures used by the process activity of the example process model. PersonInfo is representing the input container; CreditInfo representing the output container.

The part information within the FlowMark Definition Language is specified in the STRUCTURE section (refer to line 1 and 15 of FIG. 1.) The beginning of the parts information is signalled by the PART keyword (refer to line 7 and 18 of FIG. 1.) The subsequent keyword TYPE_IN indicates that the following information is for the input container (refer to line 18 of FIG. 1;) TYPE_OUT indicates that the following information is for the output container (refer to line 7 of FIG. 1.) If no specification of this nature is detected, TYPE_IN is assumed.

Whether the generated part should be optimized for memory consumption or speed of processing, is specified by the keywords MEMORY_OPTIMIZATION or SPEED_OPTIMIZATION, respectively (refer to line 8 and 19 of FIG. 1.) If not specified, optimization is for speed.

PART_NAME specifies the name of the reusable part to be generated. If not specified, the part name is constructed by appending the name of the data structure with In for input container parts and Out for output container parts.

PART_DESCRIPTION (refer to line 9 and 20 of FIG. 1) provides a description for the part.

CLASS_FILE specifies the name of the header (.hpp) and implementation (.cpp) files for the part. If not specified, the part name is used. If in this case the file name is too long on a FAT file system, and is generated as follows. If it is an input container, the first six characters are taken and appended with the character string In; if it is an output container, the first five characters are taken and appended with the character string Out. The file extension is always .hpp for the header file and .cpp for the implementation file.

The name of the part file to be generated can be specified via the PART_FILE (refer to line 11 and 22 of FIG. 1) keyword. If not specified, the same name as that for the class file is used. The extension is always .vbe.

It is also possible to specify that an icon is associated with the part. This allows identification of the icon on the parts palette (refer to the VisualAge documentation for the palette details). An appropriate DLL is to be provided also. The appropriate DLL can be specified via the DLL_NAME keyword together with the ICON_ID keyword. Refer to line 12, 13, 23 and 24 of FIG. 1 for an example.

DESCRIPTION specifies a description for each field. This information is used by the Visual Builder.

With respect to lines 15 to 25 of the specific example in FIG. 1, the following is valid: The parts information within this FlowMark Definition File example is for an input container reusable part as indicated by the TYPE_IN keyword. As indicated by the MEMORY_OPTIMIZATION keyword, it will be optimized for memory consumption of the reusable part to be generated, that means all fields will be retrieved in the constructor method. The name of the part is not specified via PART_NAME, and will therefore default to PersonInfoIn, the data structure's name appended with In for input. The description of the part is Person Info In. The class header and implementation files are peinfin.hpp and peinfin.cpp. The part file will be stored as persinfo.vbe. The appropriate icon has the id 4711, the icon itself is stored in the DLL persicon.dll.

B. .vbe File Generation

Based on the associations detected within the FlowMark Definition File associating the process model to reusable parts of a reusable parts environment, the part information files (with file name extension .vbe) for the generated input container reusable parts and the generated output container reusable parts are generated. With respect to the credit application example, FIG. 4 and FIG. 5 reflect the generated part information files for the generated input container reusable part and the generated output container reusable part respectively. By comparing the part information file contents of FIGS. 4 and 5 with the FlowMark Definition File it is evident how the information of FlowMark Definition File is used to generate the part information files.

Comparing the information in the FlowMark Definition File of FIG. 1 and the generated part information file for an input container reusable part of FIG. 4 the following observation can be made:

a. The appropriate part main information in the VisualAge import file format of FIG. 4 is stored in a file with the file name of PERSINFO.vbe (refer to line 21 of FIG. 1.) Such a file is generated for each data structure detected within a FlowMark Definition File.

b. The name of the generated reusable part is PersonInfoIn (compare line 15 in FIG. 1 with line 1 in FIG. 4.) The part inherits as any nonvisual part from IStandardNotifier (refer to line 2 of FIG. 4.)

c. The appropriate header file for the generated class of the reusable part is found in peinfin.hpp (compare line 21 in FIG. 1 with line 3 in FIG. 4.) This file is later imported into VisualAge to provide VisualAge with the appropriate part information.

d. For each field in the data structure detected in the FlowMark Definition File of FIG. 1 an attribute is created as shown in FIG. 4. FirstName is the name of the attribute, First Name is the description of the attribute as specified via the DESCRIPTION keyword (compare line 16 in FIG. 1 with lines 7 and 8 in FIG. 4.)

e. FirstName is the method to obtain the attribute value (following the naming standards of IBM Open Class Library); refer to line 10 of FIG. 4.

f. For fields in an generated output container part, an attribute is also created for each field. However, the attribute does not have, as shown in FIG. 5, a get method, but a set method, setFirstName, and has a notifier, FirstNameId, (compare line 2 in FIG. 1 with line 10, 12 in FIG. 4) associated.

g. The preferred feature list is automatically generated for all user-specified attributes as shown in FIG. 4. These attributes will be shown immediately when making connections with the part during the process of visual programming within VisualAge's Visual Builder. The system defined attributes of the data structure are not defined as preferred features. Refer to FIG. 4 line 23.

C. .hpp File Generation

Based on the associations detected within the FlowMark Definition File associating the process model to reusable parts of a reusable parts environment the header files (with file name extension .hpp) for the generated input container reusable parts and the generated output container reusable parts are generated. With respect to the credit application example, FIG. 6 and FIG. 7 reflect the generated header files for the generated input container reusable part and the generated output container reusable part, respectively.

By comparing the header file contents of FIGS. 6 and 7 with the FlowMark Definition File, it is evident how the information of the FlowMark Definition File is used to generate the header files.

Comparing the information in the FlowMark Definition File of FIG. 1 and the generated header files, the following observation can be made:

a. For each generated part, a header file is created. FIG. 6 shows the generated header file for the input container reusable part of the PersonInfo data structure as shown in FIG. 1, lines 15 to 25. FIG. 7 shows the generated header file for the output container reusable part of the CreditInfo data structure as shown in FIG. 1, lines 1 to 14.

b. istring.hpp is included as some of the attributes are of type ISTRING (refer to lines 16 and 17 in FIG. 1 and lines 3 to 5 in FIG. 6;) istdntfy.hpp is included as the created class inherits from IStandardNotifier (refer to lines 6 to 8 in FIG. 6.)

c. For each attribute, an associated get method is created. The methods are defined as virtual so that they can be overwritten and as const as it is not intended that the methods modify data (refer to lines 15 to 18 in FIG. 6.)

D. .cpp File Generation

Based on the associations detected within the FlowMark Definition File associating the process model to reusable parts of a reusable parts environment, the implementation files in C++ programming language (with file name extension .cpp) for the generated input container reusable parts and the generated output container reusable parts are generated. With respect to the credit application example FIGS. 8a and 8b and FIGS. 9a, 9b and 9c reflect the generated implementation files for the generated input container reusable part and the generated output container reusable part, respectively.

By comparing the implementation file contents of FIGS. 8 and 9 with the FlowMark Definition File it is evident how the information of the FlowMark Definition File is used to generate the implementation files.

Comparing the information in the FlowMark Definition File of FIG. 1 and the generated implementation files the following observations can be made:

a. FIGS. 8a and 8b show the implementation file for an input container reusable part. The header file is exmp-japc.h for the FlowMark application programming interface (refer to FIG. 8a, line 7); exmvap.hpp contains declarations and definitions to be used in all class implementation files (refer to FIG. 8a, line 8.)

b. The constructor PersonInfoIn (refer to FIG. 8a, line 9 to FIG. 8b, line 27 ) obtains the input container via two calls to FlowMark. The first call obtains the length of the input container (refer to FIG. 8a, lines 11–15), so that the appropriate variable which holds the input container can be allocated the proper size. In the second call (refer to FIG. 8a, lines 17–21) the input container is moved to the variable for further use.

c. If the code is optimized for memory, each field in the input container is obtained and stored in the proper attribute. Then the container is freed.

d. For each attribute a get method is created as shown in FIG. 8b, lines 31–38.

e. For an example of an implementation file for an output container reusable part refer to FIGS. 9a, 9b and 9c.

f. For each attribute, the notification identification is filled with the proper information (refer to FIG. 9a, lines 12–23).

g. The generated set methods (refer to FIG. 9b, line 8 to FIG. 9c line 30) for the attribute checks whether the field value is the same, and if not stores the field value in the attribute and notifies any observers.

h. The actual writing to the output container is performed in the destructor, but only for those attributes for which a field value has been set; refer to FIG. 9a, line 33 to FIG. 9b, line 7.

E. Usage of a Generated Input/Output Container Reusable Parts

Figure 10:
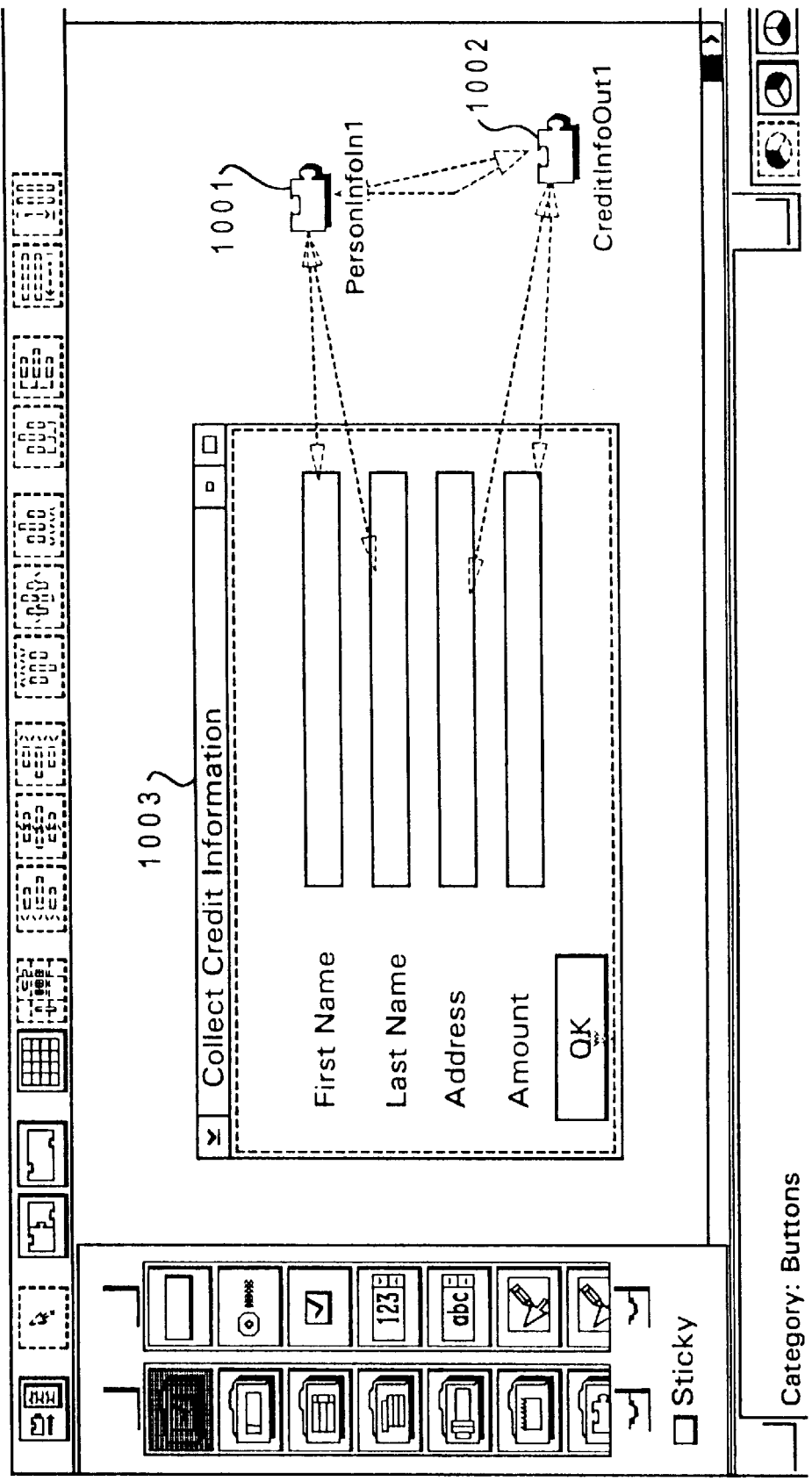
FIG. 10 shows the Visual Builder of VisualAge with two generated input and output container parts.

FIG. 10 shows the VisualBuilder of VisualAge with two generated input and output container parts, the PersonInfo part 1001 and the CreditInfo 1002 part, reflecting the process of visual programming. In FIG. 10 the generated parts are used to build a new user interface 1003 just by graphically relating (refer to the arrows of FIG. 10) individual fields of the user interface to the individual attributes of the generated input and output container reusable parts.

F. Acronyms

| | |
|---|---|
| DLL | Dynamical Link Library |
| FDL | FlowMark Definition Language |
| OO | Object-Oriented |

While the invention has been particularly shown and described with reference to a preferred embodiment, it will be understood by those skilled in the art that various changes in form and detail may be made therein without departing from the spirit and scope of the invention.

What is claimed is:

1. A data processing system implemented method of extending specifications of a process model within a workflow process environment, wherein said process model defines a process activity managed and executed by at least one data processing system and said process activity has associated with it an interface container implemented within a reusable parts environment, said method comprising the steps of:

linking said process model with said reusable parts environment;

associating with said process model, an interface container reusable part, said interface container reusable part implementing said interface container and residing within said reusable parts environment; and storing an interface container reusable part specification corresponding to said interface container reusable part within said process model such that said specifications of said process model are extended in response to said associating step.

2. A method as set forth in claim 1, said associating step further comprising the steps of:

associating a name with said interface container reusable part; and storing a name specification within said interface container reusable part specification within said process model.

3. A method as set forth in claim 1, said associating step further comprising the steps of:

associating a description with said interface container reusable part; and storing a description specification within said interface container reusable part specification within said process model.

4. A method as set forth in claim 1, said associating step further comprising the steps of:

associating a header file and an implementation file with said interface container reusable part; and storing a header file specification and a implementation file specification within said interface container reusable part specification within said process model.

5. A method as set forth in claim 1, said associating step further comprising the steps of:

associating a reusable part information file with said interface container reusable part; and storing a reusable part information file specification within said interface container reusable part specification within said process model.

6. A method as set forth in claim 1, said associating step further comprising the steps of:

associating an icon identification and an icon dynamic link library with said interface container reusable part; and storing an icon identification specification and an icon dynamic link library specification within said interface container reusable part specification within said process model.

7. A method as set forth in claim 1, said associating step further comprising the steps of:

associating an optimization target with said interface container reusable part; and storing an optimization target specification within said interface container reusable part specification within said process model.

8. A data processing system implemented method of generating for a process model residing within a workflow process environment, an implementation of an interface container as a reusable part residing within a reusable parts environment utilizing specifications of said process model, said method comprising the steps of:

analyzing a workflow process activity of an interface container reusable part specification of said process model; and generating an interface container reusable part by utilizing said analyzed workflow results of said interface container reusable part specification and in response to a detection by said analyzing step, of an interface container reusable part specification within said process model.

9. A method as set forth in claim 8, wherein said generating step further comprises the step of:

generating an interface container reusable part which is optimized in response to the detection, by said analyzing step, of an optimization target specification.

10. A method as set forth in claim 8, further comprising the steps of:

generating an attribute name for each input parameter detected by said analyzing step; and generating an associated attribute for each input parameter detected by said analyzing step, each associated attribute having a type and length dependent upon a type and length of its corresponding input parameter.

11. A method as set forth in claim 10, further comprising the steps of:

generating a get-attribute method for each associated attribute, said get-attribute method enabling a retrieval of a current value of said associated attribute; and generating a constructor for said interface container reusable part, said constructor enabling each said associated attribute to be set to a current value stored in a corresponding interface container within said workflow process environment.

12. A method as set forth in claim 8, further comprising the steps of:

generating an attribute name for each output parameter detected by said analyzing step; and generating an associated attribute for each output parameter detected by said analyzing step, each associated attribute having a type and length dependent upon a type and length of its corresponding output parameter.

13. A method as set forth in claim 12, further comprising the steps of:

generating a set-attribute method for each associated attribute, said set-attribute method enabling a storage of a new value into said associated attribute;

generating a constructor for said interface container reusable part, said constructor enabling each said associated attribute to be set to a current value stored in a corresponding interface container within said workflow process environment; and generating a destructor for said interface container reusable part, said destructor enabling a transfer of a value of an associated attribute within said interface container reusable part to a corresponding interface container within said workflow process environment.

14. A method as set forth in claim 8, wherein in response to a detection by said analyzing step of a reusable part information file specification within said interface container reusable part specification within said process model, said generating step further comprises the steps of:

writing generation results into a reusable part information file associated with said reusable part information file specification; and declaring said interface container reusable part within said reusable parts environment in response to said step of writing generation results into a reusable part information file.

15. A method as set forth in claim 8, wherein in response to a detection by said analyzing step of a header file specification within said interface container reusable part specification within said process model, said generating step further comprises the steps of:

writing generation results into a header file associated with said header file specification; and defining said interface container reusable part for a potentially utilizing program in response to said step of writing generation results into a header file.

16. A data processing system for extending specifications of a process model within a workflow process environment, wherein said process model defines a process activity managed and executed by at least one data processing system and said process activity has associated with it an interface container implemented within a reusable parts environment, said data processing system comprising:

means for linking said process model with said reusable parts environment;

means for associating with said process model, an interface container reusable part, said interface container reusable part implementing said interface container and residing within said reusable parts environment; and means for storing an interface container reusable part specification corresponding to said interface container reusable part within said process model such that said specifications of said process model are extended in response to said means for associating.

17. A data processing system as set forth in claim 16, wherein said interface container reusable part further implements an object structure, and wherein said implementation is enhanced by development accessories which support visual programming in a graphical editing environment.

18. A data processing system for generating for a process model residing within a workflow process environment, an implementation of an interface container as a reusable part residing within a reusable parts environment utilizing specifications of said process model, said data processing system comprising:

means for analyzing a workflow process activity of an interface container reusable part specification of said process model; and means for generating an interface container reusable part by utilizing said analyzed workflow results of said interface container reusable part specification and in response to a detection by said means for analyzing, of an interface container reusable part specification within said process model.

19. A computer program product, to be utilized within a data processing system, for extending specifications of a process model within a workflow process environment, wherein said process model defines a process activity managed and executed by at least one data processing system and said process activity has associated with it an interface container implemented within a reusable parts environment, said computer program product comprising:

media usable by said data processing system for storing and executing instruction means;

instruction means embodied within said media for linking said process model with said reusable parts environment;

instruction means embodied within said media for associating with said process model, an interface container reusable part, said interface container reusable part implementing said interface container and residing within said reusable parts environment; and instruction means embodied within said media for storing an interface container reusable part specification corresponding to said interface container reusable part within said process model such that said specifications of said process model are extended in response to said instruction means for associating.

20. A computer program product to be utilized within a data processing system for generating for a process model residing within a workflow process environment, an implementation of an interface container as a reusable part residing within a reusable parts environment utilizing specifications of said process model, said computer program product comprising:

instruction means embodied within said media for analyzing a workflow process activity of an interface container reusable part specification of said process model; and instruction means embodied within said media for generating an interface container reusable part by utilizing said analyzed workflow results of said interface container reusable part specification and in response to a detection by said instruction means for analyzing, of an interface container reusable part specification within said process model.

* * * * *